(12) United States Patent
Oto et al.

(10) Patent No.: US 12,431,493 B2
(45) Date of Patent: Sep. 30, 2025

(54) NONAQUEOUS MAGNESIUM BATTERY

(71) Applicant: Panasonic Intellectual Property Management Co., Ltd., Osaka (JP)

(72) Inventors: Takashi Oto, Osaka (JP); Masahisa Fujimoto, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 498 days.

(21) Appl. No.: 17/923,799

(22) PCT Filed: Apr. 6, 2021

(86) PCT No.: PCT/JP2021/014567
§ 371 (c)(1),
(2) Date: Nov. 7, 2022

(87) PCT Pub. No.: WO2021/229956
PCT Pub. Date: Nov. 18, 2021

(65) Prior Publication Data
US 2023/0207797 A1 Jun. 29, 2023

(30) Foreign Application Priority Data
May 14, 2020 (JP) ................................ 2020-085374

(51) Int. Cl.
*H01M 4/52* (2010.01)
*H01M 4/38* (2006.01)
(Continued)

(52) U.S. Cl.
CPC ............. *H01M 4/52* (2013.01); *H01M 4/381* (2013.01); *H01M 10/054* (2013.01);
(Continued)

(58) Field of Classification Search
CPC .......... H01M 4/52; H01M 4/505; H01M 4/38; H01M 10/054; H01M 10/0568
See application file for complete search history.

(56) References Cited

U.S. PATENT DOCUMENTS 5,789,113 A 8/1998 Joo et al.
9,225,015 B2 * 12/2015 Lee ....................... H01M 12/06
(Continued)

FOREIGN PATENT DOCUMENTS

JP 9-147866 A 6/1997
JP 11-025968 A 1/1999
(Continued)

OTHER PUBLICATIONS

International Search Report issued on Jun. 29, 2021 in International Application No. PCT/JP2021/014567, with English translation.
(Continued)

*Primary Examiner* — Barbara L Gilliam
(74) *Attorney, Agent, or Firm* — Rimon P.C.

(57) ABSTRACT

A non-aqueous magnesium battery includes a positive electrode, a negative electrode, and an electrolyte. The positive electrode contains a positive electrode active material and can occlude and release magnesium ions. The electrolyte solution contains, for example, a magnesium salt. The positive electrode active material contains nickel oxyhydroxide, and the nickel oxyhydroxide is layered.

8 Claims, 6 Drawing Sheets

(51) Int. Cl.
  *H01M 10/054* (2010.01)
  *H01M 10/0568* (2010.01)
  *H01M 4/02* (2006.01)

(52) U.S. Cl.
  CPC .. *H01M 10/0568* (2013.01); *H01M 2004/028* (2013.01); *H01M 2300/0025* (2013.01)

(56) References Cited

U.S. PATENT DOCUMENTS

| | | |
|---|---|---|
| 2006/0257742 A1 | 11/2006 | Kato et al. |
| 2015/0349344 A1* | 12/2015 | Shelekhin ............ H01M 4/625 252/182.1 |
| 2017/0294675 A1 | 10/2017 | Kubota et al. |
| 2018/0331361 A1 | 11/2018 | Nelson et al. |
| 2019/0165420 A1 | 5/2019 | Matsumoto et al. |
| 2019/0326599 A1* | 10/2019 | Tei ...................... H01M 10/054 |

FOREIGN PATENT DOCUMENTS

| | | |
|---|---|---|
| JP | 2004-265675 A | 9/2004 |
| JP | 2005-322551 A | 11/2005 |
| JP | 2013-037993 A | 2/2013 |
| WO | 2005/045958 A1 | 5/2005 |
| WO | 2016/056629 A1 | 4/2016 |
| WO | 2017/150577 A1 | 9/2017 |
| WO | 2018/131578 A1 | 7/2018 |

OTHER PUBLICATIONS

Journal of The Electrochemical Society, 2014, vol. 161, No. 4, p. A593-A598.
Nature Chemistry, 2018, vol. 10, p. 532-539.
The EPC Office Action dated Sep. 29, 2023 for the related European Patent Application No. 21803709.1.

* cited by examiner

NONAQUEOUS MAGNESIUM BATTERY

CROSS-REFERENCE OF RELATED APPLICATIONS

This application is the U.S. National Phase under 35 U.S.C. § 371 of International Patent Application No. PCT/JP2021/014567, filed on Apr. 6, 2021, which in turn claims the benefit of Japanese Patent Application No. 2020-085374, filed on May 14, 2020, the entire disclosures of which Applications are incorporated by reference herein.

TECHNICAL FIELD

The present disclosure relates to a non-aqueous magnesium battery.

BACKGROUND ART

In recent years, studies on non-aqueous magnesium batteries have attracted attention.

NPL 1 describes a magnesium battery including $Mo_6S_8$ having a Chevrel phase as a positive electrode active material. NPL 2 describes a magnesium battery including $V_2O_5$ as a positive electrode active material.

CITATION LIST

Non-Patent Literature

NPL 1: Journal of The Electrochemical Society, 2014, Vol. 161, No. 4, p. A593-A598
NPL 2: Nature Chemistry, 2018, Vol. 10, p. 532-539

SUMMARY OF THE INVENTION

Technical Problem

The present disclosure provides a non-aqueous magnesium battery having high reaction potential and high reversible capacity.

Solution to Problem

The present disclosure provides a non-aqueous magnesium battery including: a positive electrode containing a positive electrode active material and capable of occluding and releasing magnesium ions; a negative electrode; and an electrolyte containing a magnesium salt, wherein the positive electrode active material contains nickel oxyhydroxide, and the nickel oxyhydroxide is layered.

Advantageous Effect of Invention

According to the present disclosure, it is possible to provide a non-aqueous magnesium battery having high reaction potential and high reversible capacity.

Figure 1:
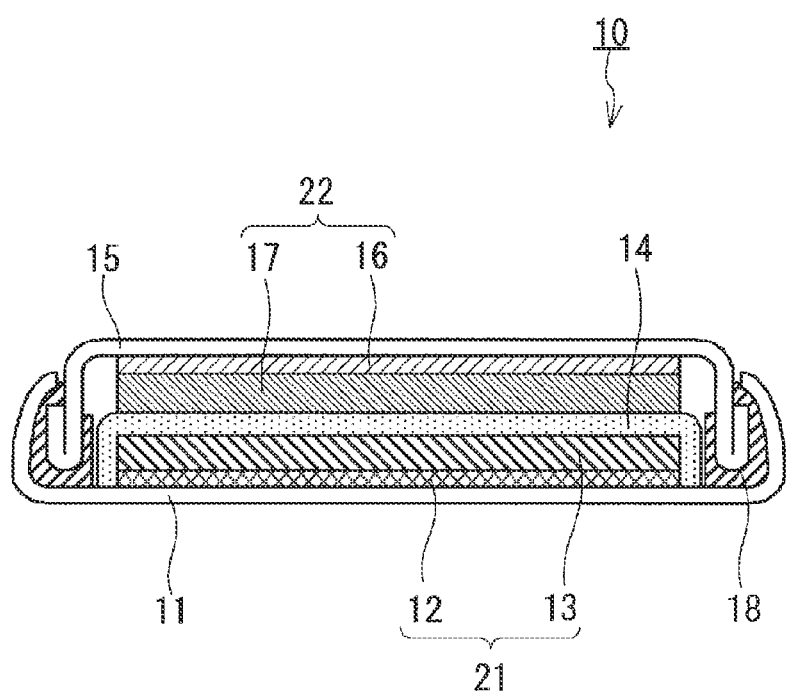
FIG. 1 is a sectional view schematically illustrating a configuration example of a non-aqueous magnesium battery.

DESCRIPTION OF EMBODIMENT (Findings Leading to the Present Disclosure)

In recent years, multivalent-ion batteries using multivalent ions as carriers have been actively studied. Examples of the multivalent-ion batteries include calcium batteries using $Ca^{2+}$ as a carrier, beryllium batteries using $Be^{2+}$ as a carrier, manganese batteries using $Mn^{2+}$ as a carrier, nickel batteries using $Ni^{2+}$ as a carrier, zinc batteries using $Zn^{2+}$ as a carrier, yttrium batteries using $Y^{3+}$ as a carrier, aluminum batteries using $Al^{3+}$ as a carrier, and non-aqueous magnesium batteries using $Mg^{2+}$ as a carrier. Research on non-aqueous magnesium batteries has recently attracted attention.

The theoretical capacity per unit mass and theoretical capacity per unit volume of magnesium are large. In addition, magnesium shows relatively low oxidation-reduction potential. Thus, batteries using magnesium for a negative electrode are expected to have high energy density. In particular, the theoretical capacity per unit volume of magnesium is higher than the theoretical capacity per unit volume of lithium. Thus, non-aqueous magnesium batteries enable installation of a large-capacity battery in a limited space such as an electric vehicle. Further, the reserves of magnesium in the earth's crust are larger than those of lithium in the earth's crust. Thus, according to the non-aqueous magnesium batteries, problems of resource depletion and cost, which are disadvantages of lithium-ion batteries, are less likely to occur.

The melting point of magnesium is about 650° C. The melting point of lithium is about 180° C. The melting point of sodium is about 98° C. The melting point of magnesium is much higher than the melting points of lithium and sodium. Since the melting point is an index of the stability of metal, use of magnesium in a battery can improve the safety of the battery. Further, lithium and sodium react vigorously with, for example, moisture in air. On the other hand, magnesium is stable in air and thus can be easily handled. For these reasons, non-aqueous magnesium batteries have been actively studied as batteries to replace lithium-ion batteries.

However, there are many problems to be overcome to realize multivalent-ion batteries such as non-aqueous magnesium batteries. In particular, development of positive electrode materials is important. The Coulomb interaction between multivalent ions and anions contained in a positive electrode material is stronger than the Coulomb interaction between lithium ions and anions contained in the positive electrode material. Thus, the diffusion rate of multivalent ions in the positive electrode material is slower than the diffusion rate of lithium ions. This may be a factor that greatly limits the reaction in multivalent-ion batteries.

NPL 1 discloses a compound containing a soft base such as a sulfur ion and having a Chevrel phase. According to NPL 1, the reaction potential and reversible capacity of this compound are about 1.1 V and about 116 mAh/g, respectively. It is hard to say that the reaction potential and reversible capacity of this compound are high.

NPL 2 discloses a positive electrode containing $V_2O_5$, which is an oxide. According to NPL 2, the reaction potential and reversible capacity of this compound are about 1.5 V and about 75 mAh/g, respectively. Although the reaction potential of $V_2O_5$ is higher than the reaction potential of the compound described in NPL 1, it is hard to say that the reversible capacity of $V_2O_5$ is high.

From the above viewpoint, it is required to develop a positive electrode material of a magnesium battery that is excellent in the diffusion rate of magnesium ions and has high reversible capacity and high reaction potential.

As a result of intensive studies, the inventors of the present invention have found that the above-described problems can be solved with a compound having a specific composition, and they have completed the present disclosure.

(Overview of One Aspect According to the Present Disclosure)

A non-aqueous magnesium battery according to a first aspect of the present disclosure includes:
 a positive electrode containing a positive electrode active material and capable of occluding and releasing magnesium ions;
 a negative electrode; and
 an electrolyte containing a magnesium salt. The positive electrode active material contains nickel oxyhydroxide, and the nickel oxyhydroxide is layered.

According to the first aspect, it is possible to provide a non-aqueous magnesium battery having high reaction potential and high reversible capacity.

In a second aspect of the present disclosure, for example, in the non-aqueous magnesium battery according to the first aspect, the nickel oxyhydroxide may contain a compound represented by a composition formula of $NiOOH_x$ and may satisfy $0<x\leq1$. x may be in a range from 0.3 to 1, inclusive.

In a third aspect of the present disclosure, for example, in the non-aqueous magnesium battery according to the second aspect, the nickel oxyhydroxide may contain a compound represented by a composition formula of $NiOOH_x$ and may satisfy $0<x<1$. x may be in a range from more than or equal to 0.3 to less than 1.

In a fourth aspect of the present disclosure, for example, in the non-aqueous magnesium battery according to the first aspect, the nickel oxyhydroxide may contain γ-NiOOH.

According to the second to fourth aspects, it is possible to provide a non-aqueous magnesium battery having high reaction potential and high reversible capacity with improved certainty.

In a fifth aspect of the present disclosure, for example, in the non-aqueous magnesium battery according to any one of the first to fourth aspects, the negative electrode may contain metallic magnesium.

In a sixth aspect of the present disclosure, for example, in the non-aqueous magnesium battery according to the first to fourth aspects, the negative electrode may contain a negative electrode active material that occludes and releases magnesium ions.

According to the fifth and sixth aspects, it is possible to provide a non-aqueous magnesium battery having high reaction potential and high reversible capacity with improved certainty.

Hereinafter, a positive electrode active material according to an exemplary embodiment and a non-aqueous magnesium battery including the positive electrode active material will be described in detail with reference to the drawings.

The following description is intended to provide a comprehensive or specific example. Numerical values, compositions, shapes, film thicknesses, electrical characteristics, structures of secondary batteries, and the like shown below are merely examples, and are not intended to limit the present disclosure. In addition, configuration elements not recited in independent claims indicating the broadest concept are optional configuration elements.

[1. Positive Electrode Active Material]

Non-aqueous magnesium batteries, in which a two-electron reaction of magnesium can be used, are expected to be put to practical use as high-capacity batteries. However, since the interaction between divalent magnesium ions and anions in an active material is large, the magnesium ions are less likely to move in the active material, and the electrode reaction in the active material is less likely to proceed.

As a result of intensive studies, the inventors of the present invention have found a novel positive electrode active material described below.

A non-aqueous magnesium battery according to an exemplary embodiment includes a positive electrode containing a positive electrode active material, a negative electrode, and an electrolyte solution. The positive electrode may occlude and release magnesium ions. The electrolyte solution has, for example, magnesium ion conductivity. In the non-aqueous magnesium battery according to the exemplary embodiment, the positive electrode active material contains nickel oxyhydroxide that is layered. The positive electrode may contain only the layered nickel oxyhydroxide as the positive electrode active material, or may contain other compounds. The layered nickel oxyhydroxide may occlude and release magnesium ions between layers of nickel oxyhydroxide, for example. This enables the non-aqueous magnesium battery to have high reaction potential and high reversible capacity.

The content of the layered nickel oxyhydroxide in the positive electrode active material is not limited to specific values. Appropriately adjusting the content of the layered nickel oxyhydroxide enables the non-aqueous magnesium battery to have high reaction potential and high reversible capacity.

The layered nickel oxyhydroxide may contain a compound represented by a composition formula of $NiOOH_x$ and satisfying $0<x\leq1$. The layered nickel oxyhydroxide may contain only a compound represented by a composition formula of $NiOOH_x$ and satisfying $0<x\leq1$.

Alternatively, the layered nickel oxyhydroxide may contain a compound represented by a composition formula of $NiOOH_x$ and satisfying $0<x<1$. The layered nickel oxyhydroxide may contain only a compound represented by a composition formula of $NiOOH_x$ and satisfying $0<x<1$.

The layered nickel oxyhydroxide may contain γ-NiOOH. γ-NiOOH is nickel oxyhydroxide of γ type. In γ-NiOOH, for example, the oxidation number of Ni is in a range from 3.0 to 3.7, inclusive. Such a configuration enables the non-aqueous magnesium battery to have high reaction potential and high reversible capacity with improved certainty. γ-NiOOH is obtained, for example, by oxidizing β-NiOOH described later.

The layered nickel oxyhydroxide may include β-NiOOH. β-NiOOH is nickel oxyhydroxide of β type. In β-NiOOH, for example, the oxidation number of Ni is in a range from 3.0 to 3.7, inclusive.

The layered nickel oxyhydroxide may include γ-NiOOH and β-NiOOH. Such a configuration enables the non-aqueous magnesium battery to have high reaction potential and high reversible capacity with improved certainty. The content of γ-NiOOH and the content of β-NiOOH contained in the positive electrode active material are not limited to specific values. Appropriately adjusting the content of γ-NiOOH and the content of β-NiOOH contained in the positive electrode active material enables the non-aqueous magnesium battery to have high reaction potential and high reversible capacity with improved certainty.

In the positive electrode active material, the content of γ-NiOOH may be larger than the content of β-NiOOH. In general, the oxidation number of nickel in γ-NiOOH is certainly higher than the oxidation number of nickel in β-NiOOH. Thus, the number of reactive electrons of γ-NiOOH is larger than the number of reactive electrons of β-NiOOH. Making the content of γ-NiOOH larger than the content of β-NiOOH enables the non-aqueous magnesium battery to have high reaction potential and high reversible capacity with improved certainty.

The positive electrode active material may contain γ-NiOOH as a main component. γ-NiOOH has a high oxidation number of Ni among nickel oxyhydroxides. Thus, containing γ-NiOOH as a main component in the positive electrode active material enables the non-aqueous magnesium battery to have high reaction potential and high reversible capacity with improved certainty. In the present disclosure, the term "main component" means a component contained in the positive electrode active material most in mass ratio.

The positive electrode active material may contain only γ-NiOOH. This enables the non-aqueous magnesium battery to have high reaction potential and high reversible capacity with improved certainty.

[2. Method for Producing Positive Electrode Active Material]

The positive electrode active material according to the exemplary embodiment is produced, for example, by oxidizing nickel (II) hydroxide.

For the oxidation treatment, for example, an alkaline aqueous solution is used. The alkaline aqueous solution is obtained, for example, by mixing a sodium hypochlorite aqueous solution and a potassium hydroxide aqueous solution and stirring the mixture at 80° C. For example, a hot stirrer is used for the stirring, Next, for example, a nickel (II) hydroxide powder manufactured by Kojundo Chemical Lab. Co., Ltd. is added to the alkaline aqueous solution, and the mixture is stirred at 80° C. to oxidize nickel, thereby preparing a nickel oxyhydroxide-containing liquid. For example, a hot stirrer is used for the stirring, The nickel oxyhydroxide-containing liquid after stirring contains a precipitate and a supernatant liquid. Thus, the supernatant liquid is removed from the nickel oxyhydroxide-containing liquid and replaced with water to obtain a mixed liquid. Thereafter, the mixed liquid is allowed to stand.

The time for allowing the mixed liquid to stand is, for example, 1 hour to 100 hours. After the mixed liquid is allowed to stand, water is removed from the mixed liquid by suction filtration under reduced pressure to obtain a solid. For example, a vacuum pump is used for the suction filtration.

The solid is washed with water. For example, suction filtration is used for the washing. When the pH of the solution obtained by suction filtration is in a range from 7 to 14, inclusive, the washing of the solid is terminated.

Next, the washed solid is vacuum-dried at 60° C. to remove moisture from the solid. By pulverizing and sizing the dried solid, the layered nickel oxyhydroxide can be obtained. For example, a mortar is used for pulverizing the solid. For example, a sieve is used for sizing the solid.

The composition of the layered nickel oxyhydroxide may be determined, for example, by inductively coupled plasma (ICP) emission spectroscopy. The crystal structure of the layered nickel oxyhydroxide may be determined, for example, by powder X-ray diffraction.

In the layered nickel oxyhydroxide, the oxidation number of nickel as a transition metal may be determined, for example, by X-ray absorption fine structure (XAFS) analysis using a beam line of radiation light.

[3. Magnesium Battery]

[3-1. Overall Configuration]

The positive electrode active material according to the exemplary embodiment may be used for a non-aqueous magnesium battery. The non-aqueous magnesium battery includes a positive electrode containing a positive electrode active material, a negative electrode, and an electrolyte having magnesium ion conductivity. The electrolyte contains, for example, a magnesium salt.

FIG. 1 is a sectional view schematically illustrating a configuration example of non-aqueous magnesium battery 10.

Non-aqueous magnesium battery 10 includes positive electrode 21, negative electrode 22, separator 14, case 11, sealing plate 15, and gasket 18. Separator 14 is disposed between positive electrode 21 and negative electrode 22. Positive electrode 21, negative electrode 22, and separator 14 are impregnated with a non-aqueous electrolyte solution, and these are housed in case 11. Case 11 is closed by gasket 18 and sealing plate 15.

Case 11 houses positive electrode 21, negative electrode 22, and separator 14. The shape and material of case 11 are not limited to specific aspects. Case 11 is not limited to that illustrated in FIG. 1, and a case of a known battery may be appropriately selected and used.

The structure of non-aqueous magnesium battery 10 may be a cylindrical type, a prismatic type, a button type, a coin type, or a flat type.

[3-2. Positive Electrode]

Positive electrode 21 includes positive current collector 12 and positive electrode active material layer 13 disposed on positive current collector 12. Positive electrode active material layer 13 is disposed between positive current collector 12 and separator 14.

Positive electrode active material layer 13 contains the positive electrode active material described above in [1. Positive electrode active material]. Such a configuration can provide a positive electrode for a non-aqueous magnesium battery having high reversible capacity, high reaction potential, and high energy density.

Positive electrode active material layer 13 may further contain at least either a conductive material or a binder as necessary.

Examples of the conductive material include a carbon material, a metal, an inorganic compound, and a conductive polymer. Examples of the carbon material include graphite, acetylene black, carbon black, Ketjen black, carbon whisker, needle cokes, and carbon fibers. Examples of the graphite include natural graphite and artificial graphite. Examples of the natural graphite include lump graphite and scaly graphite. Examples of the metal include copper, nickel, aluminum, silver, and gold. Examples of the inorganic compound include tungsten carbide, titanium carbide, tantalum carbide, molybdenum carbide, titanium boride, and titanium nitride. These materials may be used alone or in combination of two or more.

Examples of the binder include a fluorine-containing resin, a thermoplastic resin, an ethylene propylene diene monomer (EPDM) rubber, a sulfonated EPDM rubber, and a natural butyl rubber (NBR). Examples of the fluorine-containing resin include polytetrafluoroethylene (PTFE), polyvinylidene fluoride (PVdF), and fluororubber. Examples of the thermoplastic resin include polypropylene and polyethylene. These materials may be used alone or in combination of two or more.

Examples of the solvent for dispersing the positive electrode active material, the conductive material, and the binder include N-methylpyrrolidone, dimethylformamide, dimethylacetamide, methyl ethyl ketone, cyclohexanone, methyl acetate, methyl acrylate, diethylenetriamine, N,N-dimethylaminopropylamine, ethylene oxide, and tetrahydrofuran. A thickener may be added to the dispersant. Examples of the thickener include carboxymethylcellulose and methylcellulose.

Positive electrode active material layer 13 is formed, for example, by the following method. First, these materials are mixed to obtain a mixture of the positive electrode active material, the conductive material, and the binder. Next, an appropriate solvent is added to the mixture to obtain a paste-like positive electrode mixture. Next, the positive electrode mixture is applied to the surface of positive current collector 12 and dried. Positive electrode active material layer 13 is thus formed on positive current collector 12. Positive electrode active material layer 13 may be compressed to increase the electrode density.

The film thickness of positive electrode active material layer 13 is not limited to specific values. The film thickness is, for example, in a range from 1 μm to 100 μm, inclusive.

The material of positive current collector 12 is, for example, a single metal or alloy. More specifically, the material of positive current collector 12 may be a single metal or alloy containing at least one selected from the group consisting of copper, chromium, nickel, titanium, platinum, gold, aluminum, tungsten, iron, and molybdenum. The material of positive current collector 12 may be stainless steel.

Positive current collector 12 may have a plate shape or a foil shape. Positive current collector 12 may be a stacked film.

When case 11 also serves as a positive current collector, positive current collector 12 may be omitted.

[3-3. Negative Electrode]

Negative electrode 22 includes, for example, negative electrode active material layer 17 containing a negative electrode active material, and a negative current collector 16. Negative electrode active material layer 17 is disposed between negative current collector 16 and separator 14.

Negative electrode 22 contains a negative electrode active material capable of occluding and releasing magnesium ions. That is, negative electrode active material layer 17 contains a negative electrode active material capable of occluding and releasing magnesium ions. Examples of the negative electrode active material include a carbon material. Examples of the carbon material include graphite, non-graphite carbon, and a graphite intercalation compound. Examples of the non-graphite carbon include hard carbon and cokes.

Negative electrode active material layer 17 may further contain at least either a conductive material or a binder as necessary. For the conductive material, binder, solvent, and thickener, for example, the conductive material, binder, solvent, and thickener described in [3-2. Positive electrode] may be appropriately used.

The film thickness of negative electrode active material layer 17 is not limited to specific values. The film thickness is, for example, in a range from 1 μm to 50 μm, inclusive.

Alternatively, negative electrode active material layer 17 contains a negative electrode active material capable of precipitating and dissolving magnesium. In this case, examples of the negative electrode active material include metallic magnesium and a magnesium alloy. The magnesium alloy is, for example, an alloy of magnesium and at least one selected from the group consisting of aluminum, silicon, gallium, zinc, tin, manganese, bismuth, and antimony.

For the material of the negative current collector 16, for example, the same material as that of the positive current collector 12 described in [3-2. Positive electrode] may be appropriately used. Negative current collector 16 may have a plate shape or a foil shape.

When sealing plate 15 also serves as a negative current collector, negative current collector 16 may be omitted.

When negative current collector 16 is formed of a material capable of precipitating and dissolving magnesium on the surface thereof, negative electrode active material layer 17 may be omitted. That is, negative electrode 22 may be formed of only negative current collector 16 capable of precipitating and dissolving magnesium. In this case, negative current collector 16 may be stainless steel, nickel, copper, or iron.

[3-4. Separator]

Examples of the material of separator 14 include a microporous thin film, a woven fabric, and a nonwoven fabric. The material of separator 14 may be a polyolefin such as polypropylene or polyethylene. The thickness of separator 14 is, for example, in a range from 10 μm to 300 μm, inclusive. Separator 14 may be a single-layer film formed of one material, a composite film formed of two or more materials, or a multilayer film. The porosity of separator 14 is, for example, in a range from 30% to 70%, inclusive.

[3-5. Electrolyte]

The electrolyte may be a material having magnesium ion conductivity.

The electrolyte is, for example, a non-aqueous electrolyte solution. The non-aqueous electrolyte solution contains a non-aqueous solvent and a magnesium salt dissolved in the non-aqueous solvent.

Examples of the non-aqueous solvent include a cyclic ether, a chain ether, a cyclic carbonate ester, a chain carbonate ester, a cyclic carboxylate ester, a chain carboxylate ester, a pyrocarbonate ester, a phosphoric acid ester, a boric acid ester, a sulfuric acid ester, a sulfite ester, a cyclic sulfone, a chain sulfone, a nitrile, and a sultone.

Examples of the cyclic ether include 1,3-dioxolane, 4-methyl-1,3-dioxolane, tetrahydrofuran, 2-methyltetrahydrofuran, propylene oxide, 1,2-butylene oxide, 1,4-dioxane, 1,3,5-trioxane, furan, 2-methylfuran, 1,8-cineole, crown ethers, and derivatives thereof.

Examples of the chain ether include 1,2-dimethoxyethane, diethyl ether, dipropyl ether, diisopropyl ether, dibutyl ether, dihexyl ether, ethyl vinyl ether, butyl vinyl ether, methyl phenyl ether, ethyl phenyl ether, butyl phenyl ether, pentyl phenyl ether, methoxytoluene, benzyl ethyl ether, diphenyl ether, dibenzyl ether, o-dimethoxybenzene, 1,2-diethoxyethane, 1,2-dibutoxyethane, diethylene glycol dimethyl ether, diethylene glycol diethyl ether, diethylene glycol dibutyl ether, 1,1-dimethoxymethane, 1,1-diethoxyethane, triethylene glycol dimethyl ether, tetraethylene glycol dimethyl ether, and derivatives thereof.

Examples of the cyclic carbonate ester include ethylene carbonate, propylene carbonate, butylene carbonate, vinylene carbonate, fluoroethylene carbonate, 4,5-difluoroethylene carbonate, 4,4,4-trifluoroethylene carbonate, fluoromethylethylene carbonate, trifluoromethylethylene carbonate, 4-fluoropropylene carbonate, 5-fluoropropylene carbonate, and derivatives thereof.

Examples of the chain carbonate ester include dimethyl carbonate, ethyl methyl carbonate, diethyl carbonate, methyl propyl carbonate, ethyl propyl carbonate, methyl isopropyl carbonate, and derivatives thereof.

Examples of the cyclic carboxylic acid ester include γ-butyrolactone, γ-valerolactone, γ-caprolactone, ε-caprolactone, α-acetolactone, and derivatives thereof.

Examples of the chain carboxylic acid ester include methyl acetate, ethyl acetate, propyl acetate, butyl acetate, methyl propionate, ethyl propionate, propyl propionate, butyl propionate, and derivatives thereof.

Examples of the pyrocarbonate ester include diethylpyrocarbonate, dimethylpyrocarbonate, di-tert-butyl dicarbonate, and derivatives thereof. Examples of the phosphoric acid ester include trimethylphosphate, triethylphosphate, hexamethylphosphoramide, and derivatives thereof. Examples of the boric acid ester include trimethylborate, triethylborate, and derivatives thereof. Examples of the sulfuric acid ester include trimethylsulfate, triethylsulfate, and derivatives thereof. Examples of the sulfite ester include ethylene sulfite and derivatives thereof.

Examples of the cyclic sulfone include sulfolane and derivatives thereof. Examples of the chain sulfone include alkyl sulfone and derivatives thereof. Examples of the nitrile include acetonitrile, valeronitrile, propionitrile, trimethylacetonitrile, cyclopentanecarbonitrile, adiponitrile, pimelonitrile, and derivatives thereof. Examples of the sultone include 1,3-propane sultone and derivatives thereof.

As the solvent, only one of the above substances may be used, or two or more thereof may be used in combination.

Examples of the magnesium salt include $MgBr_2$, $MgI_2$, $MgCl_2$, $Mg(AsF_6)_2$, $Mg(ClO_4)_2$, $Mg(PF_6)_2$, $Mg(BF_4)_2$, $Mg(CF_3SO_3)_2$, $Mg[N(CF_3SO_2)_2]_2$, $Mg(SbF_6)_2$, $Mg(SiF_6)_2$, $Mg[C(CF_3SO_2)_3]_2$, $Mg[N(FSO_2)_2]_2$, $Mg[N(C_2F_5SO_2)_2]_2$, $MgB_{10}Cl_{10}$, $MgB_{12}Cl_{12}$, $Mg[B(C_6F_5)_4]_2$, $Mg[B(C_6H_5)_4]_2$, $Mg[N(SO_2CF_2CF_3)_2]_2$, $Mg[BF_3C_2F_5]_2$, $Mg[PF_3(CF_2CF_3)_3]_2$, and $Mg[B(OCH(CF_3)_2)_4]_2$. As the magnesium salt, only one of the above substances may be used, or two or more thereof may be used in combination.

The electrolyte may be a solid electrolyte. In this case, examples of the solid electrolyte include $Mg_{2-1.5x}Al_xSiO_4$, $Mg_{2-1.5y-0.5z}Al_{y-z}Zn_zSiO_4$, $MgZr_4(PO_4)_6$, $MgM1PO_4$, $Mg_{1-a}M2_aM3(M4O_4)_3$, and $Mg(BH_4)(NH_2)$. x satisfies $0.1 \leq x \leq 1$. y satisfies $0.5 \leq y \leq 1$. z satisfies $0.5 \leq z \leq 0.9$. y–z satisfies $y-z \geq 0$. y+z satisfies $y+z \leq 1$. M1 is at least one selected from the group consisting of Zr, Nb, and Hf. M2 is at least one selected from the group consisting of Ca, Sr, Ba, and Ra. M3 is at least one selected from Zr and Hf. M4 is at least one selected from W and Mo. a satisfies $0 \leq a < 1$.

EXAMPLES

Example 1

(Production of Positive Electrode Active Material)

a mixed liquid was prepared by adding 87 mL of a 10 mass % aqueous sodium hypochlorite solution and 30 mL of a 48 mass % aqueous potassium hydroxide solution to a glass beaker. The mixed liquid was stirred at 80° C. using a hot stirrer to obtain an alkaline aqueous solution.

Next, 6 g of nickel hydroxide (II) powder manufactured by Kojundo Chemical Lab. Co., Ltd. was added to the alkaline aqueous solution to prepare a mixture. The mixture was stirred at 80° C. for 1 hour using a hot stirrer to prepare a nickel oxyhydroxide- containing liquid. The nickel oxyhydroxide-containing liquid contains a precipitate and a supernatant liquid.

Next, the supernatant liquid was removed from the nickel oxyhydroxide-containing liquid, and water was added to the nickel oxyhydroxide-containing liquid. This operation was performed twice to obtain a mixed liquid.

The mixed liquid was allowed to stand for 60 hours, and then moisture was removed from the mixed liquid by suction filtration under reduced pressure using a vacuum pump, whereby a solid was obtained.

The solid was washed with water. Thereafter, the solid was vacuum-dried at 60° C. for 12 hours. The dried solid was pulverized and sized to obtain a positive electrode active material according to Example 1.

The crystal structure of the positive electrode active material according to Example 1 was identified by analyzing the X-ray diffraction pattern using an X-ray diffractometer MiNi Flex manufactured by Rigaku Corporation.

Figure 2A:
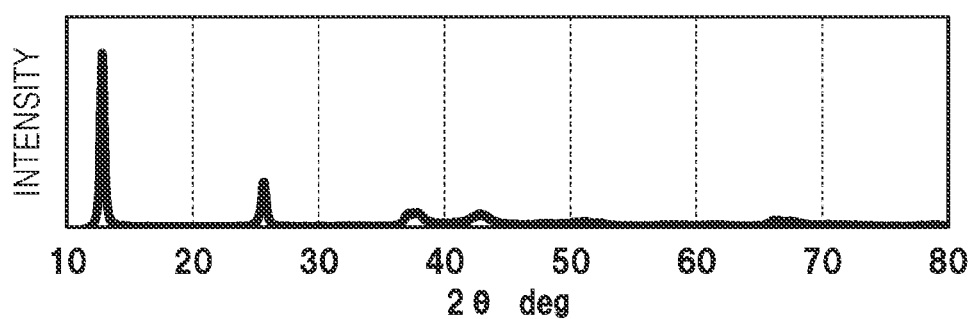
FIG. 2A is a diagram showing a result of powder X-ray diffraction measurement of a positive electrode active material according to Example 1.
Figure 2B:
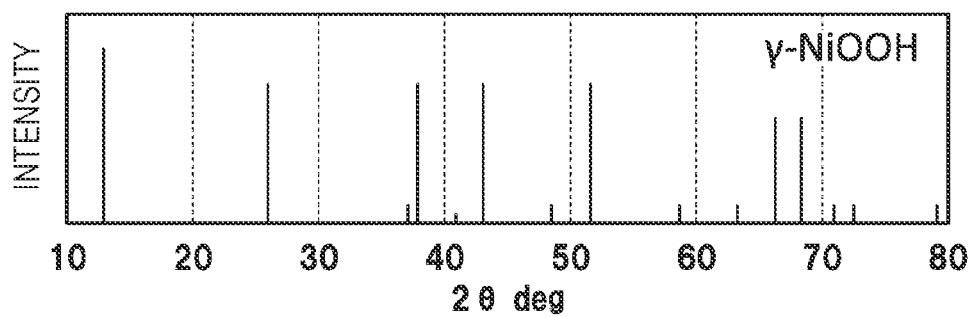
FIG. 2B is a view showing a result of powder X-ray diffraction of γ-NiOOH obtained by simulation.

FIG. 2A shows a result of powder X-ray diffraction measurement of the positive electrode active material according to Example 1. FIG. 2B shows a result of powder X-ray diffraction of γ-NiOOH obtained by simulation. As shown in FIGS. 2A and 2B, the result of powder X-ray diffraction measurement of the positive electrode active material according to Example 1 was matched well with the simulation result of the powder X-ray diffraction spectrum of γ-NiOOH. From this result, it was confirmed that a γ-NiOOH powder of high purity was synthesized.

(Production of Non-aqueous Magnesium Battery)

Figure 3:
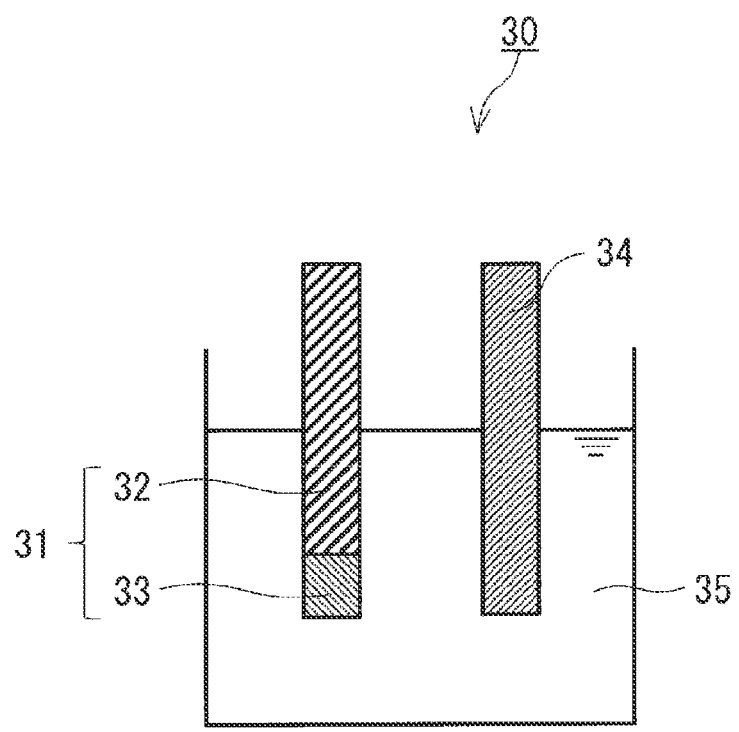
FIG. 3 is a schematic diagram illustrating a simplified configuration of a beaker cell according to Example.

FIG. 3 is a schematic diagram illustrating a simplified configuration of a beaker cell according to Example 1.

Beaker cell 30 includes positive electrode 31, negative electrode 34, and non-aqueous electrolyte solution 35. Non-aqueous electrolyte solution 35 is stored in a beaker. Positive electrode 31 includes mesh 32 and positive electrode mixture 33. Positive electrode mixture 33 is disposed at a tip of mesh 32. Positive electrode 31 and negative electrode 34 are immersed in non-aqueous electrolyte solution 35.

The positive electrode active material according to Example 1, acetylene black, and polytetrafluoroethylene were weighed in a mass ratio of 8:1:1. The weighed raw materials were mixed in a mortar to obtain a positive electrode mixture. The positive electrode mixture was punched into a square of 5 mm×5 mm. The punched positive electrode mixture was disposed at a tip of mesh 32 of 5 mm×30 mm, and pressure-bonded at a pressure of 5 MPa. Mesh 32 was made of aluminum. Positive electrode 31 according to Example 1 was thus obtained. Positive electrode 31 was dried at 105° C. for more than or equal to 6 hours under vacuum.

A magnesium ribbon having a thickness of 300 μm was cut into a size of 5 mm×40 mm to obtain a magnesium foil. The surface of the magnesium foil was scraped to remove the oxide film, and the surface was washed with acetone. Negative electrode 34 was thus obtained.

Non-aqueous electrolyte solution 35 was stored in a glass beaker. For non-aqueous electrolyte solution 35, 1,2-dimethoxyethane (DME) was used as a non-aqueous solvent. $Mg[B(OCH(CF_3)_2)_4]_2 \cdot 3$ DME, which is an organic borate complex salt in which 1,2-dimethoxyethane is coordinated, was dissolved at a concentration of 0.3 mol/L in 1,2-dimethoxyethane to obtain non-aqueous electrolyte solution 35.

Positive electrode 31 and negative electrode 34 were immersed in non-aqueous electrolyte solution 35 to produce beaker cell 30 having the configuration illustrated in FIG. 3. A non-aqueous magnesium battery was produced under an argon atmosphere.

(Charge and Discharge Test)

A charge and discharge test of the prepared non-aqueous magnesium battery was performed at a temperature of 60° C. under an argon atmosphere.

Figure 4:
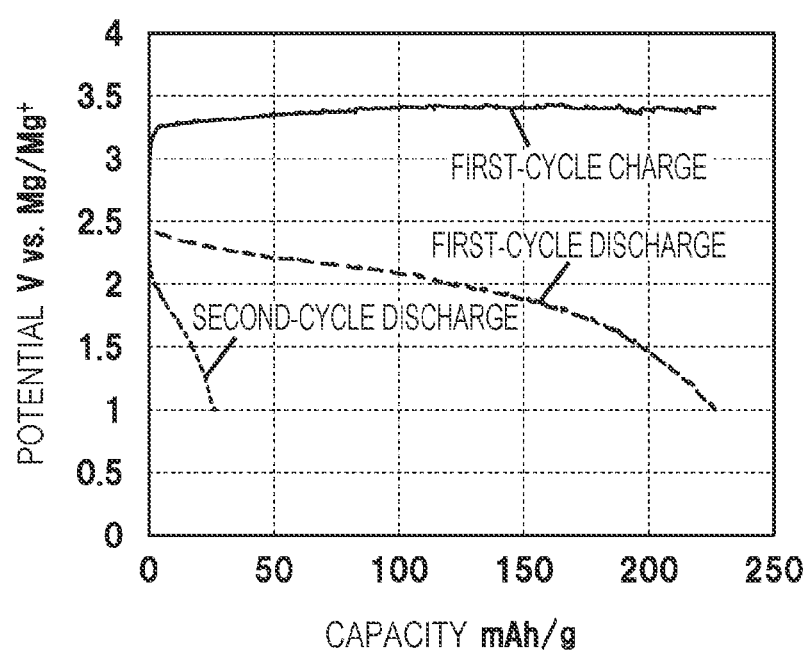
FIG. 4 is a graph showing a result of a charge and discharge test of a non-aqueous magnesium battery according to Example 1.

FIG. 4 is a graph showing a result of the charge and discharge test of a non-aqueous magnesium battery according to Example 1.

The charge and discharge test was performed using a charge-discharge device VSP-300 manufactured by Bio-Logic Science Instruments Ltd. First, it is assumed that the crystal structure of the positive electrode active material according to Example 1 is a nickel oxyhydroxide NiOOH single phase. At this time, the capacity of the positive electrode active material according to Example 1 is assumed to be 461 mAh/g. In this case, the non-aqueous magnesium battery according to Example 1 was discharged with a C rate set to 0.01. Specifically, the non-aqueous magnesium battery according to Example 1 was discharged with a discharge termination voltage set to 1.0 V. The discharge capacity at the first cycle was 226 mAh/g. After the discharge, the open circuit condition was maintained for 5 hours. Next, the non-aqueous magnesium battery according to Example 1 was charged with a C rate set to 0.01. The charge capacity at the first cycle was 226 mAh/g. A charge and discharge reaction was confirmed by the charge and discharge test. After the first-cycle charge, the non-aqueous magnesium battery according to Example 1 was discharged again. The discharge capacity at the second cycle was 26 mAh/g. The discharge capacity at the second cycle decreased as compared with the discharge capacity at the first cycle. It is considered that this is because the charge capacity in the first cycle also includes a capacity due to oxidative decomposition of the electrolyte solution. In Example 1, the reaction potential, which is the average value of the charge potential and the discharge potential, was about 2.7 V.

Example 2

(Production of Positive Electrode Active Material)

A positive electrode active material according to Example 2 was obtained in the same manner as in Example 1 except that a nickel oxyhydroxide-containing liquid was prepared by stirring the mixture for 30 minutes using a hot stirrer.

The crystal structure of the positive electrode active material according to Example 2 was identified by analyzing the X-ray diffraction pattern using an X-ray diffractometer MiNi Flex manufactured by Rigaku Corporation.

Figure 5A:
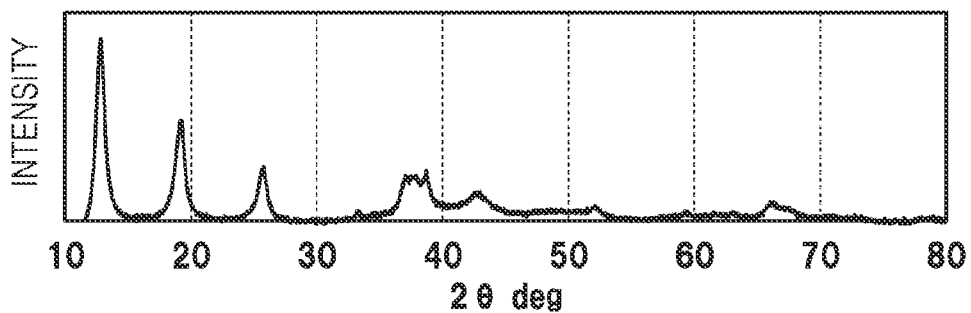
FIG. 5A is a diagram showing a result of powder X-ray diffraction measurement of a positive electrode active material according to Example 2.
Figure 5B:
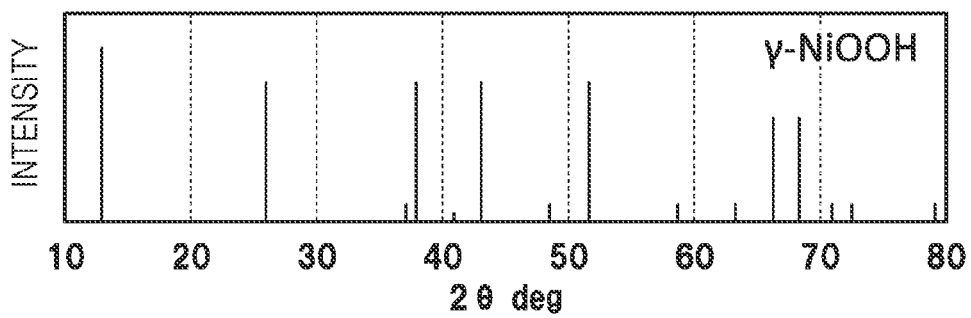
FIG. 5B is a view showing a result of powder X-ray diffraction of γ-NiOOH obtained by simulation.
Figure 5C:
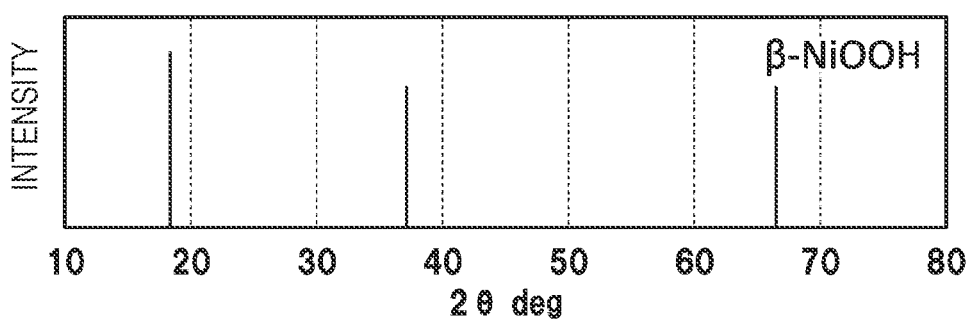
FIG. 5C is a view showing a result of powder X-ray diffraction of β-NiOOH obtained by simulation.

FIG. 5A shows a result of powder X-ray diffraction measurement of the positive electrode active material according to Example 2. FIG. 5B shows a result of powder X-ray diffraction of γ-NiOOH obtained by simulation. FIG. 5C shows a result of powder X-ray diffraction of β-NiOOH obtained by simulation. As shown in FIGS. 5A to 5C, the result of powder X-ray diffraction measurement of the positive electrode active material according to Example 2 were matched well with the result of the simulation of the powder X-ray diffraction spectrum of γ-NiOOH and the result of the simulation of the powder X-ray diffraction spectrum of β-NiOOH. From this result, it was confirmed that a powder containing γ-NiOOH and β-NiOOH was synthesized in Example 2.

(Production of Non-aqueous Magnesium Battery)

A non-aqueous magnesium battery according to Example 2 was obtained in the same manner as in Example 1 except that the positive electrode active material according to Example 2 was used instead of the positive electrode active material according to Example 1.

(Charge and Discharge Test)

A charge and discharge test of the prepared non-aqueous magnesium battery was performed at a temperature of 60° C. under an argon atmosphere.

Figure 6:
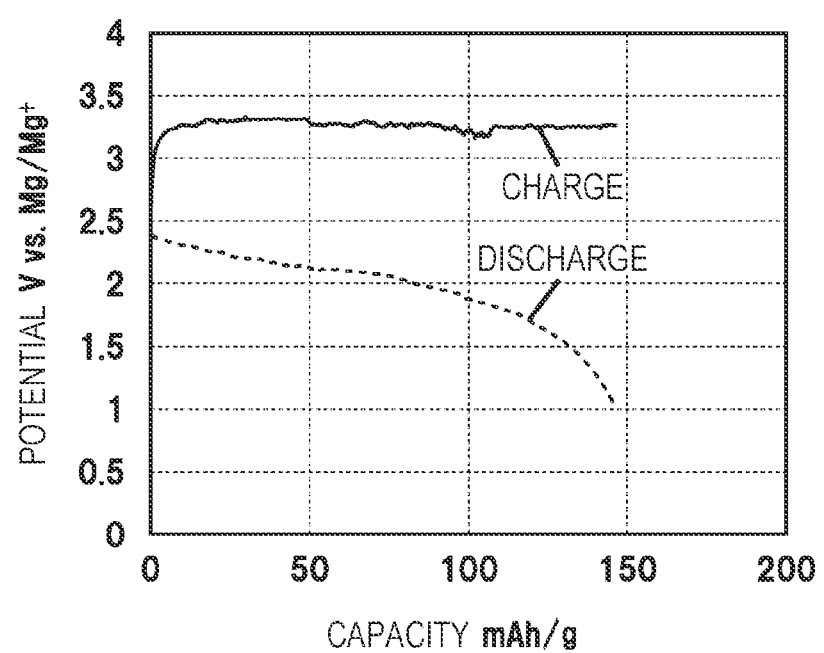
FIG. 6 is a graph showing a result of a charge and discharge test of a non-aqueous magnesium battery according to Example 2.

FIG. 6 is a graph showing a result of the charge and discharge test of the non-aqueous magnesium battery according to Example 2.

The charge and discharge test was performed using a charge-discharge device VSP-300 manufactured by Bio-Logic Science Instruments Ltd. First, it is assumed that the crystal structure of the positive electrode active material according to Example 1 is a nickel oxyhydroxide NiOOH single phase. At this time, the capacity of the positive electrode active material according to Example 2 is assumed to be 461 mAh/g. In this case, the non-aqueous magnesium battery according to Example 2 was discharged with a C rate set to 0.01. Specifically, the non-aqueous magnesium battery according to Example 1 was discharged with a discharge termination voltage set to 1.0 V. The discharge capacity was 147 mAh/g. After the discharge, the open circuit condition was maintained for 5 hours. Next, the non-aqueous magnesium battery according to Example 2 was charged with a C rate set to 0.01. The charge capacity was 147 mAh/g. Note that, similarly to the charge and discharge of the non-aqueous magnesium battery according to Example 1, the charge capacity in the first cycle of the non-aqueous magnesium battery according to Example 2 is considered to include a capacity due to oxidative decomposition of the electrolyte solution. In Example 2, the reaction potential, which is the average value of the charge potential and the discharge potential, was about 2.7 V.

The density of $Mo_6S_8$, which is a sulfide having a Chevrel phase described in NPL 1, is 5.2 g/cm$^3$. According to NPL 1, the discharge capacity and reaction potential of $Mo_6S_8$ are about 116 mAh/g and about 1.1 V, respectively. The density of vanadium pentoxide $V_2O_5$, which is an oxide described in NPL 2, is 3.4 g/cm$^3$. According to NPL 2, the discharge capacity and reaction potential of $V_2O_5$ are about 75 mAh/g and about 1.5 V, respectively. The density of the powder of γ-NiOOH, which is the compound according to Example 1, is 3.8 g/cm$^3$. The discharge capacity and reaction potential of the positive electrode active material according to Example 1 were 226 mAh/g and about 2.7 V, respectively. The density of the mixed powder of γ-NiOOH and β-NiOOH, which is the compound according to Example 2, is more than or equal to 3.8 g/cm$^3$ and less than 4.1 g/cm$^3$. The discharge capacity and reaction potential of the mixed powder of γ-NiOOH and β-NiOOH were 147 mAh/g and about 2.7 V, respectively. The layered nickel oxyhydroxide according to Examples 1 and 2 had high discharge capacity and high reaction potential.

The mass energy density of an active material may be determined by multiplying the discharge capacity by the reaction potential. The mass energy density of $Mo_6S_8$ described in NPL 1 was about 128 mWh/g. The mass energy density of the positive electrode active material according to Example 1 was about 610 mWh/g. The mass energy density of the positive electrode active material according to Example 2 was about 397 mWh/g. The mass energy density of the positive electrode active material according to Example 1 was about 4.8 times the mass energy density of $Mo_6S_8$. The mass energy density of the positive electrode active material according to Example 2 was about 3.1 times the mass energy density of $Mo_6S_8$. It was found that a positive electrode active material containing the layered nickel oxyhydroxide has high volume energy density.

The volume energy density of an active material may be determined by multiplying the density of the compound by the reversible capacity and the reaction potential. The volume energy density of $Mo_6S_8$ described in NPL 1 was about 664 mWh/cm³. The volume energy density of the positive electrode active material according to Example 1 was about 2,319 mWh/cm³. The volume energy density of the positive electrode active material according to Example 2 was about 1,508 mWh/cm³ or more. The volume energy density of the positive electrode active material according to Example 1 was about 3.5 times the volume energy density of $Mo_6S_8$. The volume energy density of the positive electrode active material according to Example 2 was about 2.3 times the volume energy density of $Mo_6S_8$. It was found that a positive electrode active material containing the layered nickel oxyhydroxide has high volume energy density.

INDUSTRIAL APPLICABILITY

The positive electrode active material of the present disclosure may be used for a non-aqueous magnesium battery.

REFERENCE MARKS IN THE DRAWINGS 10 non-aqueous magnesium battery
11 case
12 positive current collector
13 positive electrode active material layer
14 separator
15 sealing plate
16 negative current collector
17 negative electrode active material layer
18 gasket
21 positive electrode
22 negative electrode
30 beaker cell
31 positive electrode
32 mesh
33 positive electrode mixture
34 negative electrode
35 non-aqueous electrolyte solution

The invention claimed is:

1. A non-aqueous magnesium secondary battery comprising:
a positive electrode containing a positive electrode active material;
a negative electrode; and
a non-aqueous electrolyte containing a magnesium salt, wherein the positive electrode active material contains nickel oxyhydroxide, and the nickel oxyhydroxide has a plurality of layers, between which magnesium ions are occluded and released.

2. The non-aqueous magnesium battery according to claim 1, wherein
the nickel oxyhydroxide contains a compound represented by a compositional formula of $NiOOH_x$, and
the nickel oxyhydroxide satisfies $0 < x \leq 1$.

3. The non-aqueous magnesium battery according to claim 2, wherein the nickel oxyhydroxide contains a compound represented by a compositional formula of $NiOOH_x$, and
the nickel oxyhydroxide satisfies $0 < x < 1$.

4. The non-aqueous magnesium battery according to claim 1, wherein the nickel oxyhydroxide contains γ-NiOOH.

5. The non-aqueous magnesium battery according to claim 1, wherein the negative electrode contains metallic magnesium.

6. The non-aqueous magnesium battery according to claim 1, wherein the negative electrode contains a negative electrode active material that occludes and releases magnesium ions.

7. The non-aqueous magnesium battery according to claim 1, wherein the nickel oxyhydroxide satisfies $0.3 \leq x < 1$.

8. A non-aqueous magnesium battery comprising:
a positive electrode containing a positive electrode active material and capable of occluding and releasing magnesium ions;
a negative electrode; and
an electrolyte containing a magnesium salt, wherein:
the positive electrode active material contains nickel oxyhydroxide,
the nickel oxyhydroxide has a layered crystal structure, and
the nickel oxyhydroxide contains γ-NiOOH and β-NiOOH, and a content of γ-NiOOH is larger than a content of β-NiOOH.

* * * * *